Dec. 22, 1959  A. C. DOCKRELL  2,918,076
TIRE DEFLATING DEVICE
Filed July 20, 1953

INVENTOR.
ALBERT C. DOCKRELL
BY *Bruce & Brosler*
HIS ATTORNEYS

2,918,076
Patented Dec. 22, 1959

2,918,076
TIRE DEFLATING DEVICE
Albert C. Dockrell, Oakland, Calif.

Application July 20, 1953, Serial No. 368,939

5 Claims. (Cl. 137—223)

My invention relates to pressure adjusting devices for pneumatic tires and the like, and more particularly to a tire deflating device.

In various industries such as the lumber industry, the oil industry etc., trucks and trailers are employed in the hauling of execptionally heavy loads to a destination, only to return empty. The air pressure in the tires is adjusted to the loaded condition of the truck or trailer and accordingly is set at a value for which the tires will function with maximum of traction coupled with minimum of wear under such conditions. Such value of pressure may be of the order of 76 pounds per square inch.

If nothing is done to alter the tire pressure after unloading, the existing tire pressure becomes exceedingly high for the load conditions of the return trip, resulting in abnormal wear of the tires, to say nothing of the riding discomforts to the drivers of such vehicles. Considering the cost of such tires at around $125.00 per tire, and the fact that such vehicles run on as many as 20 tires, the maintenance on tires alone can and does run into substantial sums.

Among the objects of my invention are:

(1) To provide novel and improved means of reducing pressure in a confined space to a predetermined value;

(2) To provide novel and improved means for deflating pneumatic tires to a predetermined value;

(3) To provide novel and improved means for deflating pneumatic tires to a predetermined value merely by the momentary application of finger pressure to such means;

(4) To provide novel and improved tire deflating means adapted for permanent mounting on a tire valve;

(5) To provide novel and improved tire deflating means of simple construction, requiring no precision made components except a reasonably accurately calibrated coil spring; and (6) To provide novel and improved tire deflating means which may be manufactured at low cost.

Additional objects of my invention will be brought out in the following description of a preferred embodiment of the same, taken in conjunction of the accompanying drawings wherein, Figure 1 is an outside view of the assembled device in its preferred form;

Figure 1:
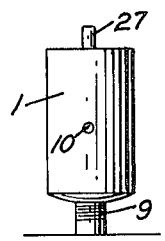
Figure 4:
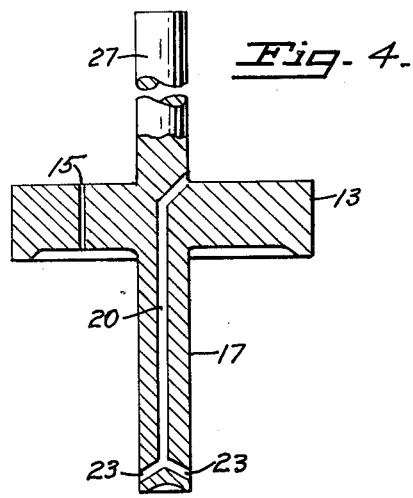
Figure 4 is a view of a piston component which plays an important part in the operation of the device of the present invention.
Figure 2:
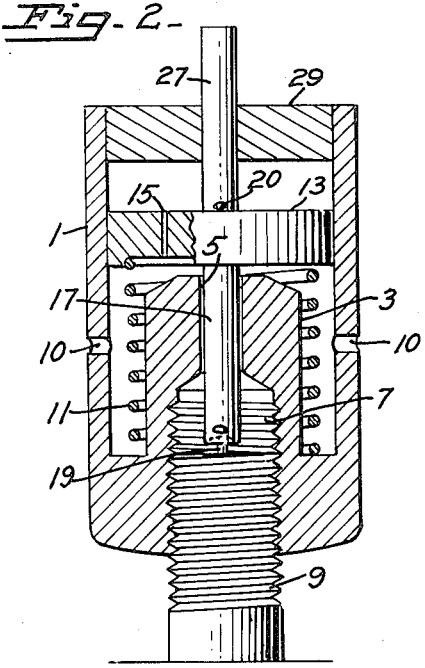
Figure 2 is a view in section, longitudinally of the device, in its normal non functioning condition.
Figure 3:
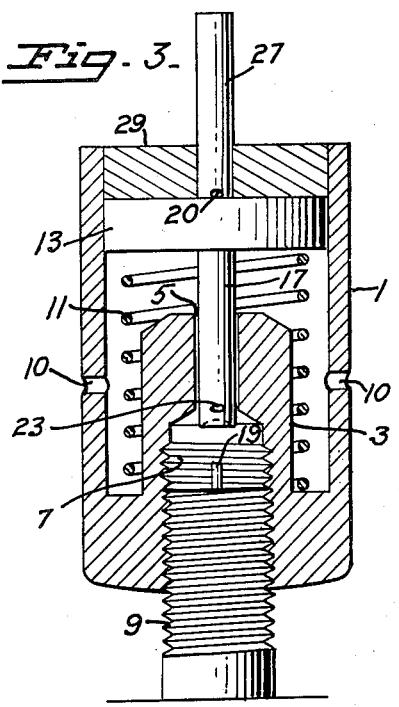
Figure 3 is a view similar to that of Figure 2, but depicting the same during an operating cycle.

Referring to the drawings for the details of my invention in its preferred form, the same involves a cylinder 1 open at one end and having a spring centering boss 3 extending inwardly at its other end, the boss having an axial passage 5 therethrough, terminating in a threaded recess 7 at the exterior end to permit threadedly securing the cylinder on a conventional tire valve 9. In the wall of the cylinder at points opposite the boss, are one or more small holes 10.

Within the cylinder and encircling the centering boss, is a coil spring 11 whose normal axial length is longer than the boss 3 so as to cause the same to extend beyond the end of the boss when disposed in the cylinder. This spring is calibrated to the deflated tire pressure called for by the vehicle in its unloaded condition.

A piston 13 slidably fitting into the cylinder, normally rests against the free end of the coil spring. This piston has a leak passage 15 of small diameter therethrough, in addition to being provided with a central valve actuating stem 17 extending therefrom in a sliding fit into the axial passage of the boss. This stem, in the nonfunctioning position of the piston, terminates adjacent the bottom of the threaded recess, so as to be normally out of engagement with the stem 19 of a tire valve on which the cylinder may be mounted.

Running longitudinally of the valve actuating stem is a bore 20 of greater diameter than the passage 15 through the piston. This bore, at the valve actuating end of the stem, terminates in one or more branch passages 23 emerging through the side of the stem, leaving the end of the stem solid for subsequent engagement with the stem 19 of the tire valve. This end is preferably concave to assure an efficient operative engagement under such conditions.

In the preferred embodiment of the invention, the branch passages are symmetrically located in the stem. At its other end, the stem bore emerges at the far side of the piston.

Extending centrally from the other side of the piston is a control stem 27 which terminates at a point beyond the open end of the cylinder which is closed about this stem by a closure plug 29 press fitted into the open end of the cylinder or otherwise affixed thereto to provide a closed cylinder and capable of forming with said piston, a chamber at the far end of said cylinder.

When put to use, the device is threaded onto the end of a conventional tire valve, after the air pressure in the tire has been adjusted to the high pressure required by the vehicle in its loaded condition. Following the dumping of such load, all that is now required to deflate the tire to the lower pressure, is to merely momentarily depress the control stem to the extent of engaging and depressing the valve stem of the tire valve. The resulting opening of the valve, permits of a sudden rush of air from the tire to the chamber behind the piston, where it will build up a pressure condition behind the piston comparable to the pressure in the tire. This pressure, being considerably higher than the calibrated value of the spring, will hold the tire valve open despite removal of the finger pressure from the control stem.

In the meantime, the air in the chamber behind the piston will gradually leak through the piston passage 15 and to the atmosphere through the holes 10 in the cylinder wall, thus tending to reduce the pressure behind the piston and allowing release of more air from the tire with consequent reduction in tire pressure.

Such sequence of events continues until the pressure behind the piston has been gradually reduced to the calibration value of the spring, whereupon the slightest reduction thereafter, will enable the spring to predominate and drive the piston back to its normal position and enable the tire valve to close. Thus, it will be apparent, that pressure remaining in any particular tire following the closing of its valve will very closely approach the pressure calibration of the spring.

From the fact that the device automatically carries on the deflation cycle following a momentary depressing of the control stem, the work of deflating a series of tires in preparation for a return trip, involves the simple operation of merely pressing the control stem of each device.

Precision fitting of components is not critical, the essential requirement being that the spring be calibrated to the reduced tire pressure desired. For most dependable operation, the rate of flow of air from the tire to the chamber behind the piston should preferably be greater than the leakage of air from said chamber. Operativeness of the device may, however, be realized even with the leakage rate the same as the flow rate into the chamber, though the device will not function with the same degree of dependability.

In lieu of the piston of the device as described above, a diaphragm may be employed. Such diaphragm however, must have sufficient range of movement to permit required travel of the valve actuating stem.

While described as a device for deflating pneumatic tires to a lower predetermined pressure, it is conceivable that the device might find usefulness in other environments where reduction in pressure of a confined volume of gas may be in order.

From the foregoing description of my invention in its preferred form, it will be apparent that the same is subject to change and modification without departing from the underlying principles involved, and I accordingly do not desire to be limited in my protection to the specific details illustrated and described except as may be necessitated by the appended claims.

I claim:

1. A deflator comprising a cylinder open at one end having a spring centering boss extending inwardly at its other end and a hole in the wall of said cylinder opposite said boss, said boss having an axial passage therethrough, a coil spring disposed in said cylinder about said centering boss and extending beyond the end thereof, a piston slidably fitting in said cylinder and normally resting against said spring, said piston having a leak passage and a valve actuating stem extending centrally therefrom into said axial passage, said stem being of a diameter to provide a restricted clearance with said passage and having a longitudinal bore of greater cross-section than said leak passage, said bore emerging at one end through the far side of said piston and at its other end connecting to an externally exposed branch passage, a control stem extending from the far side of said piston to a point beyond the open end of said cylinder, and means closing the open end of said cylinder about said control stem.

2. A deflator comprising a cylinder open at one end having a spring centering boss extending inwardly at its other end and a hole in the wall of said cylinder opposite said boss, said boss having an axial passage therethrough, a coil spring disposed in said cylinder about said centering boss and extending beyond the end thereof, a piston slidably fitting in said cylinder and normally resting against said spring, said piston having a leak passage therethrough and a valve actuating stem extending centrally therefrom into said axial passage and normally terminating in a concave end, said stem being of a diameter to provide a restricted clearance with said passage and having a longitudinal bore of greater diameter than said leak passage, said bore emerging at one end through the far side of said piston and at its other end connecting to a pair of externally exposed diametrically directed branch passages, a control stem extending from the far side of said piston to a point beyond the open end of said cylinder, and means closing the open end of said cylinder about said control stem.

3. A deflator comprising a cylinder open at one end and having a spring centering boss extending inwardly at its other end and a hole in the wall of said cylinder opposite said boss, said boss having an axial passage therethrough terminating in a threaded recess at the exterior end to permit of threadedly securing said cylinder on a conventional tire valve, a coil spring disposed in said cylinder about said centering boss and extending beyond the end thereof, a piston slidably fitting in said cylinder and normally resting against said spring, said piston having a leak passage therethrough and a valve actuating stem extending centrally therefrom into said axial passage and normally terminating in a concave end adjacent the bottom of said threaded recess, said stem being of a diameter to provide a restricted clearance with said passage and having a longitudinal bore of greater diameter than said leak passage, said bore emerging at one end through the far side of said piston and at its other end connecting to a pair of externally exposed diametrically directed branch passages, a control stem extending from the far side of said piston to a point beyond the open end of said cylinder, and means closing the open end of said cylinder about said control stem.

4. In combination, a tire valve, a deflator comprising a cylinder, means for attaching said cylinder at one end to the tire valve or the like of the type having a depressible valve stem, manually actuable means for depressing such valve stem and forming a chamber in said cylinder having a flow connection with such valve when said cylinder is attached to such a tire valve, means causing leakage of air from said chamber, and calibrated means responsive to reduction in pressure of air in said chamber to a value below the calibration value of said calibrated means for permitting such valve to close.

5. In combination, a tire valve, a deflator comprising a cylinder, means for attaching said cylinder at one end to the tire valve or the like of the type having a depressible valve stem, manually actuable means in said cylinder for depressing such valve stem and forming a chamber in said cylinder having a flow connection with such valve when said cylinder is attached to such a tire valve, means causing leakage of air from said chamber at a lower rate than the flow of air into said chamber through such valve, and calibrated means responsive to reduction in pressure of air in said chamber to a value below the calibration value of said calibrated means for permitting such valve to close.

References Cited in the file of this patent
UNITED STATES PATENTS

| | | |
|---|---|---|
| 2,489,397 | Brummer | Nov. 29, 1949 |
| 2,685,906 | Williams | Aug. 10, 1954 |